(12) United States Patent
Lupper et al.

(10) Patent No.: US 11,606,843 B2
(45) Date of Patent: Mar. 14, 2023

(54) SYSTEMS AND METHODS FOR DYNAMIC OPTIMIZATION OF SCAN TIME IN GATEWAYS FOR ASSET MANAGEMENT

(71) Applicant: Hilti Aktiengesellschaft, Schaan (LI)

(72) Inventors: Alfred Lupper, Kaufering (DE); Muhammad Salman Malik, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 37 days.

(21) Appl. No.: 17/225,736

(22) Filed: Apr. 8, 2021

(65) Prior Publication Data
US 2022/0330383 A1 Oct. 13, 2022

(51) Int. Cl.
*H04W 64/00* (2009.01)
*H04W 12/08* (2021.01)
*H04W 88/16* (2009.01)
*H04W 52/02* (2009.01)

(52) U.S. Cl.
CPC ....... *H04W 88/16* (2013.01); *H04W 52/0206* (2013.01); *H04W 64/00* (2013.01)

(58) Field of Classification Search
CPC ..... H04W 64/00; H04W 16/28; H04W 4/026; H04W 84/18; H04W 64/006; H04W 12/08; H04W 12/12; H04W 12/64; H04W 16/32; H04W 24/10; H04W 4/021; H04W 48/04; H04W 48/16; H04W 52/283; H04W 8/005
USPC .................................. 455/456.1, 67.11, 419
See application file for complete search history.

(56) References Cited

U.S. PATENT DOCUMENTS

| | | | | |
|---|---|---|---|---|
| 9,734,682 | B2* | 8/2017 | Miller | G06K 7/10366 |
| 10,572,700 | B2* | 2/2020 | Sengstaken, Jr. | G08B 7/06 |
| 2007/0262849 | A1 | 11/2007 | Ismail | |
| 2009/0027203 | A1 | 1/2009 | Cristache | |
| 2009/0309704 | A1 | 12/2009 | Chang et al. | |
| 2014/0084060 | A1 | 3/2014 | Jain et al. | |
| 2015/0355308 | A1* | 12/2015 | Ishida | G01S 5/12 455/456.1 |

(Continued)

FOREIGN PATENT DOCUMENTS

JP        2018-19365 A        2/2018

OTHER PUBLICATIONS

Ayele et al., "An Asynchronous Dual Radio Opportunistic Beacon Network Protocol for Wildlife Monitoring System", *2019 10th IFIP International Conference on New Technologies, Mobility and Security (NTMS), IEEE*, pp. 1-7 (2019).

*Primary Examiner* — Joseph Arevalo
(74) *Attorney, Agent, or Firm* — Leydig, Voit & Mayer, Ltd.

(57) ABSTRACT

A system includes one or more assets disposed within a physical location. Each asset is coupled to a wireless tag, and each wireless tag is configured to wirelessly transmit beacon signals at predetermined intervals. The system also includes a gateway configured to cover the range of the physical location. The gateway is configured to scan the physical location to identify beacon signals transmitted by each of the wireless tags and receive the beacon signals from each wireless tag at the predetermined intervals. The gateway is also configured to dynamically optimize a function of the gateway by adjusting a current total scan time based at least in part on the number of beacon signals received from previously unknown or new wireless tags disposed within the physical location.

9 Claims, 4 Drawing Sheets

(56) References Cited

U.S. PATENT DOCUMENTS

2017/0316446 A1* 11/2017 Goodhart ............ G06Q 30/0244
2017/0323189 A1    11/2017 Chang et al.
2021/0185482 A1*  6/2021 Plläsjärvi ............. H04W 4/029

* cited by examiner

SYSTEMS AND METHODS FOR DYNAMIC OPTIMIZATION OF SCAN TIME IN GATEWAYS FOR ASSET MANAGEMENT

BACKGROUND OF THE INVENTION

The present disclosure relates generally to the field of power tools, and more particularly to systems and methods to optimize gateway function for the remote tracking of assets.

Various assets, such as corded and cordless power tools, may be useful on a typical construction jobsite. These assets may include tools such as drill machines, saws, hammers, grinders and sanders, vacuum cleaners, drivers, measuring tools, and/or other types of tools and tool accessories. Often, assets are moved between locations (e.g., a construction jobsite, a warehouse, a container, etc.) by different groups of people. Assets are typically valuable resources, and it is beneficial to track the status of a particular asset in order to improve the overall efficiency of the jobsite. Accordingly, various systems and methods may be utilized to track the location and/or the real-time status of a particular asset within a fleet of tools owned by a particular entity. In particular, assets may be tracked with tags that periodically beacons information to a remote gateway. One or more gateways may continuously and/or periodically scan for beacon signals from tags within the vicinity, and may send information received from a tag to a remote asset management system. In certain situations, a gateway may utilize large amounts of power in order to function continuously and/or periodically.

Accordingly, it is beneficial to provide for systems and methods for reducing the power consumption of a gateway by dynamically optimizing the operation and function of the gateway.

BRIEF SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes one or more assets disposed within a physical location. Each asset is coupled to a wireless tag, and each wireless tag is configured to wirelessly transmit beacon signals at predetermined intervals. The system also includes a gateway configured to cover the range of the physical location. The gateway is configured to scan the physical location to identify beacon signals transmitted by each of the wireless tags and receive the beacon signals from each wireless tag at the predetermined intervals. The gateway is also configured to dynamically optimize a function of the gateway by adjusting a current total scan time based at least in part on the number of beacon signals received from previously unknown or new wireless tags disposed within the physical location.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
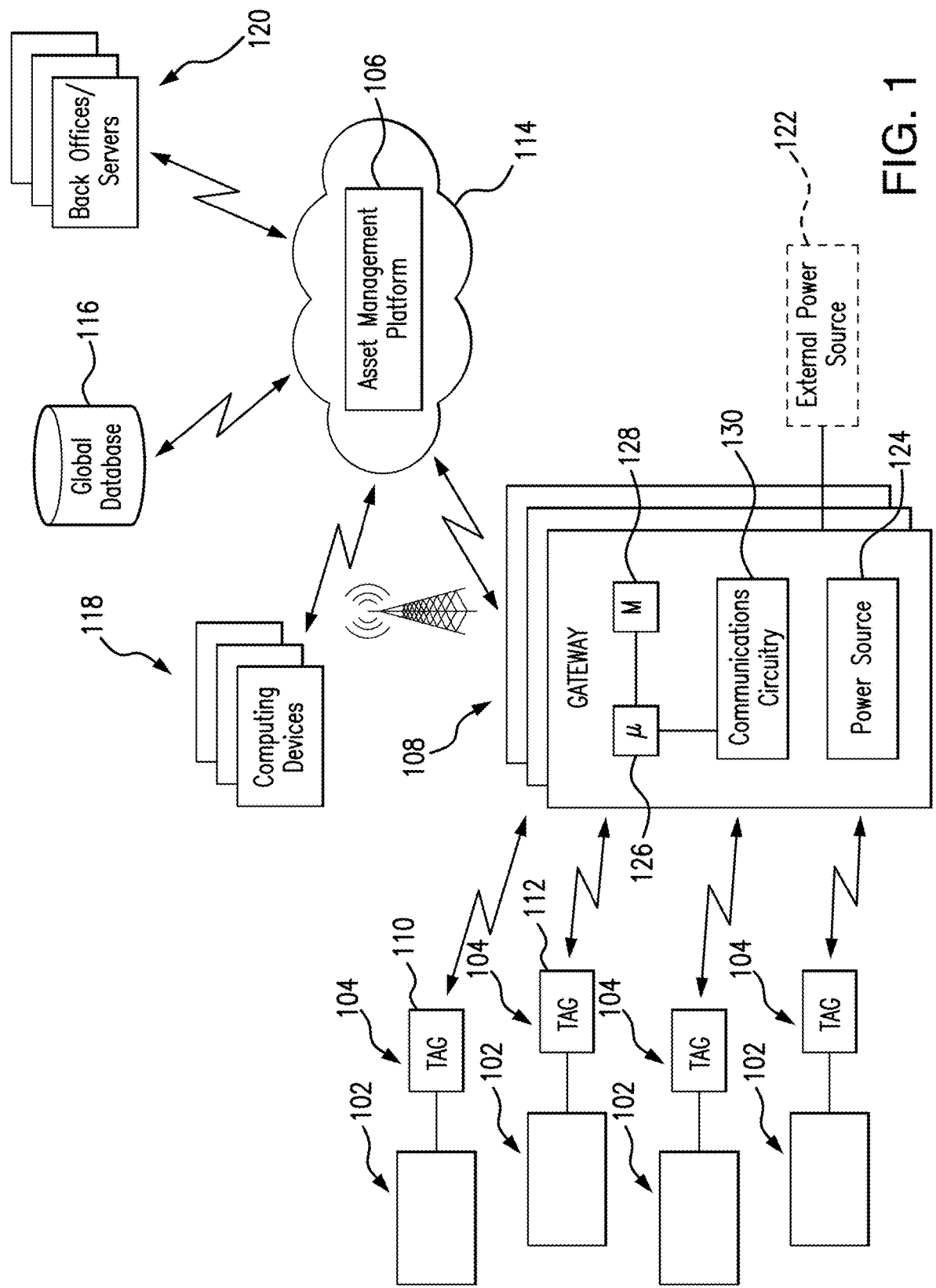
FIG. 1 is a schematic of an embodiment of a tool system having a plurality of tags and a gateway, where the gateway scans for beacons from the plurality of tags.

Turning now to the drawings, FIG. 1 is a tool system having a plurality of assets 102 disposed in a plurality of locations, where each of the plurality of assets is tracked with a remote asset management platform 106. The plurality of assets 102 may be owned by a particular entity (e.g., a corporation, an individual, an organization, etc.) or by several entities. For example, assets may include tools such as power tools (e.g., rotary hammers, drives, screw drivers, saws, grinders, etc.), drill machines, vacuum cleaners and accessories, measuring tools (e.g., detection tools, lasers, layout tools, surveying equipment, etc.), direct fastening tools, diamond cutting and drilling tools, tool accessories (e.g., tool boxes, kits, computing devices, etc.), and/or other types of tools and tool accessories that may be utilized within the construction industry. While the construction industry is utilized as an exemplary embodiment, it should be noted that the present embodiments may be applicable in other industries. In certain embodiments, assets may include any product, resource, or accessory utilized in an industrial setting that may be a valuable resource owned by the entity. For example, the present embodiments may be utilized to track assets in the manufacturing, energy, agriculture, transportation and logistics, or services industries. Assets in such industries may include, for example, shipping equipment, machinery, vehicles, telecommunications equipment, hardware, or any resource that may be a valuable asset for an entity.

In certain embodiments, the asset 102 may be removably attached to a wireless tag 104. Wireless tags 104 may be active or passive tags that are configured to wirelessly transmit and receive information to/from a remote computing device, such as a gateway 108. The wireless tag 104 may be registered and assigned to the asset 102, and the association between the tag and asset may be stored within the remote asset management platform 106. In certain embodiments, the registration and assigning process may be processed by the manufacturer and/or by the entity who acquires the asset. In certain embodiments, the entity may purchase or acquire an asset already attached, registered, and assigned to the wireless tag 104. The process of registering a tag with a particular asset may be done with any application and computing device that can identify tags and assets. In certain embodiments, tags may be removed and replaced, so that a damaged tag may be replaced, reused on a different asset, or discarded. Additionally, tags may be re-registered with a different asset, and the new association between the tag and the new asset may be stored within the remote asset management platform 106.

In certain embodiments, the tags 104 may be removably attached to an external surface of the assets 102, or they may be attached to an accessory associated with the assets 102, such as a tool case or container. In certain embodiments, the tags 104 may be mechanically attached to the assets 102 via any attachment means (e.g., adhesive, tape, snap-on, magnet features, screws, nails, press-fit feature, etc.). In certain embodiments, the tags 104 may be disposed within a cavity located on an external surface of the assets 102. In certain embodiments, the tags 104 may be disposed within a housing of the asset 102. In particular, the wireless tags 104 may be enabled to transmit and receive information to/from the gateway 108 via one or more different wireless modes of operation, such as, but not limited to, any form of radio waves, Bluetooth, Near Field Communication (NFC), Wifi, ZigBee, Z-Wave, BLE, LoRa, LoRaWAN, Sigfox, any wireless transmission utilizing radio waves, etc. In certain embodiments, a first wireless tag 110 may communicate in a first mode of wireless communication (e.g., WiFi) while a second wireless tag 112 may communicate in a second mode of wireless communication (e.g., BLE). In certain embodiments, one wireless tag 110 may be configured to communicate with one or more modes of wireless communication. In certain embodiments, the tags 104 may utilize a single mode of wireless communication (e.g., BLE), and may be configured to continuously transmit beacon signals at predetermined intervals of time (e.g., 5 seconds, 10 seconds, 15 seconds, 20 seconds, 1 minute, 5 minutes, 10 minutes, 20 minutes, 1 hour, 2 hours, 3 hours, 5 hours, 1 day, 2 days, or any interval that may be suitable to preserve battery life without compromising asset tracking).

In certain embodiments, one or more gateways 108 may be disposed around a plurality of tags 104. For example, in certain embodiments, a gateway 108 may be utilized to cover the range of a particular geographical location (physical location), such as a portion of a construction jobsite, an entire jobsite, a warehouse, a container, (e.g., a shipping container, vehicle, mode of transportation, etc.), a worker, a transportation vehicle, etc. In particular, the asset management platform 106 may include a logical location of the gateway 106, so that tags 104 and assets 102 proximate to a particular gateway 106 may be tracked or monitored. In particular, a logical location may differ from an actual or a geographical location having tangible geocoordinates. For example, a logical location stored within the asset management platform 106 may be a user-defined description of a physical location that assets owned by the entity are brought to, removed from, or stored within. Accordingly, the logical location may be a utility for the entity desiring to keep track of their assets' physical location within their enterprise. A logical location may be a virtual representation of an actual, physical location, and may be represented by the wireless range provided by the gateway 108.

Further, in certain embodiments, the gateway 108 may be assigned or preassigned to a logical location, such as "vehicle X" or "container B," which may remain constant despite the changing geolocation. Accordingly, in certain embodiments, the gateway 108 may be associated with a physical location and a logical location within the remote asset management platform 106. Assets 102 (coupled to tags 104) brought within or removed from the proximity of the gateway 108 are monitored and recorded, and this information is stored within the asset management platform 106, as further described in detail below.

In certain embodiments, the gateway 108 may be configured to receive one or more beacon signals transmitted by one or more tags 104 within the vicinity of the gateway 108, or within a predetermined geographic distance from the gateway 108. The gateway 108 may be configured to receive and process the beacon signals, and transmit the information to the remote asset management platform 106. In certain embodiments, the gateway 108 may be configured to transmit the information to the remote asset management platform 106, which is a cloud-based computing device 114, via WiFi (e.g., Institute of Electrical and Electronics Engineers [IEEE] 802.11X, cellular conduits (e.g., high speed packet access [HSPA], HSPA+, long term evolution [LTE], WiMax), personal area networks (PANs), WAN, and LAN and the like. In certain embodiments, the remote asset management platform 106 may be run on a computing device, such as one or more local or physical computing devices independent of a cloud-based server. In this manner, the gateway 108 may include edge computing capabilities that allow for it to gather, analyze and transmit information to the remote asset management platform 108. The cloud-based computing device 114 may be a service provider providing cloud analytics, cloud-based collaboration and workflow systems, distributed computing systems, expert systems and/or knowledge-based systems. In certain embodiments, the cloud-based computing device 114 may be a data repository that is coupled to an internal or external global database 116.

Further, in certain embodiments, the global database 116 may allow computing devices 118 to retrieve information stored within for additional processing or analysis. Indeed, the cloud-based computing device 114 may be accessed by a plurality of systems (computing devices 118 and/or computing devices from back offices/servers 120) from any geographic location, including geographic locations remote from the physical locations of the systems. Accordingly, the cloud 114 may enable advanced collaboration methods between parties in multiple geographic areas, provide multi-party workflows, data gathering, and data analysis, which may increase the efficiency of remotely tracking and keeping an inventory of assets owned by a particular entity in real-time.

In certain embodiments, the gateway 108 may be continuously scanning for beacon signals from tags 104 (coupled to assets 102) that are brought within or removed from the proximity of the gateway 108. The received information is transmitted and stored within the asset management platform 106. In certain embodiments, the information that is transmitted from the tags 104 to the asset management platform 106 via the gateway 108 include, for example, a time-stamp, operating parameters of the first asset 112, status information, unique identification information of the asset and/or battery, state of health (SOH) or state of charge (SOC) of the battery, or any other information that may be relevant to the asset or the status of the asset. In particular, if the gateway 108 is coupled to an external power source 122, the gateway 108 may be able to scan continuously to locate and record all the beacon signals from its range. The amount of time needed to locate and record all the beacon signals may depend on the number of tags 104, the distance of each tag 104 from the gateway 108, the distribution of the tags 104 within the range of the gateway 108, and other similar factors. For a gateway 108 coupled to an unlimited or external power source 122, the gateway 108 may continue to scan regardless of how much time it takes to locate and record all the beacon signals. For a gateway 108 that utilizes an internal power source 124 (such as a rechargeable battery), continuous scanning may drain the battery and reduce the efficiency or accuracy of the scanning. Accordingly, the present embodiments describe systems and methods for reducing the power consumption of the gateway 108 by dynamically optimizing the operation and function of the gateway 108, as further described in detail below.

In certain embodiments, the gateway 108 may include a processor 126 configured to execute instructions stored on a memory 128, communications circuitry 130, and the internal power source 124. The internal power source 124 may be a rechargeable battery that may be rechargeable by an external power source 122 (such as a power wall outlet, a vehicle power source, another external battery, etc.). In certain embodiments, the internal power source 124 may be utilized when the external power source 122 is unavailable. The communications circuitry 130 may be configured to receive information from the tags 104 and may transmit information to the asset management platform 106 via a wired or wireless connection. For example, the wireless protocols utilized may include WiFi (e.g., Institute of Electrical and Electronics Engineers [IEEE] 802.11X, cellular conduits (e.g., high speed packet access [HSPA], HSPA+, long term evolution [LTE], WiMax), personal area networks (PANs), and the like.

In particular, the processor 126 may be configured to dynamically optimize the operation and function of the communications circuitry 130 based on various factors, such as, for example, the amount of power remaining within the internal power source 124. In certain embodiments, the gateway 108 may be configured to optimize the power consumption by dynamically adapting 1) the length of the scan time based on the time it takes to scan all tags 104 and receive all beacon signals within its vicinity and/or 2) the frequency of the scans based on the rate of change in the inventory of the assets 102 and tags 104 within the vicinity of the gateway 108. In certain embodiments, in order to dynamically optimize the power consumption by the gateway 108 without compromising scanning accuracy and efficiency, the gateway 108 may be configured to adjust the total scan time based on the amount of beacon signals received from known and unknown tags 104 within the vicinity of the gateway 108, as further described with respect to FIGS. 2 and 3. In certain embodiments, in order to dynamically optimize the power consumption by the gateway 108 without compromising scanning accuracy and efficiency, the gateway 108 may be configured to adjust the frequency of the scanning, as further described with respect to FIG. 4. In certain embodiments, in order to dynamically optimize the power consumption by the gateway 108 without compromising scanning accuracy and efficiency, the gateway 108 may be configured to terminate the scan time prematurely and/or extend the scan time based on the beacon signals received within a given beaconing interval, as further described with respect to FIGS. 5 and 6.

The asset management platform 106 may be configured to record the activities of the assets 102 based on the information received from the tags 104 via the gateway 108. In certain embodiments, the asset management platform 106 maintains a historical record of events for each asset 102. As an example, when an asset 102 is physically removed from a warehouse, the gateway 108 assigned to the warehouse recognizes the missing asset by recognizing that it has not received a beacon signal from the asset 102 for a period of time. The gateway 108 records the removal of the asset 102 from the warehouse as an "event." As a further example, when a second gateway (such as one assigned to a vehicle) recognizes a new asset 102, the second gateway records an event indicating that the same asset 102 is has been added to the vehicle, and therefore, within the vehicle.

Accordingly, the asset management platform 106 records and analyzes information received from one or more gateways 108, to provide real-time information about the logical location of a particular asset. In certain embodiments, the asset management platform 106 may be configured to determine whether the assets 102 are present or missing (not found) at different locations. For example, based on events recorded from two gateways 108, the asset management platform 122 may be configured to match the location of an asset 102 or group of assets 102 with the location of gateways to identify when an asset or group of assets are not found at their expected locations but are found at unexpected locations and/or brought back to their original expected locations. As a further example, if an asset is not scanned by any gateway 108 for a period of time, the asset management platform 106 may be configured to generate an alert indicating that the asset has not been identified recently. The asset management platform 106 may also be configured to generate an alert or notification if this asset is registered by the gateway 108 again. In this manner, the asset management platform 106 may be configured to remotely track and keep an inventory of assets owned by a particular entity (or multiple, independent entities) over a plurality of different locations.

Figure 2:
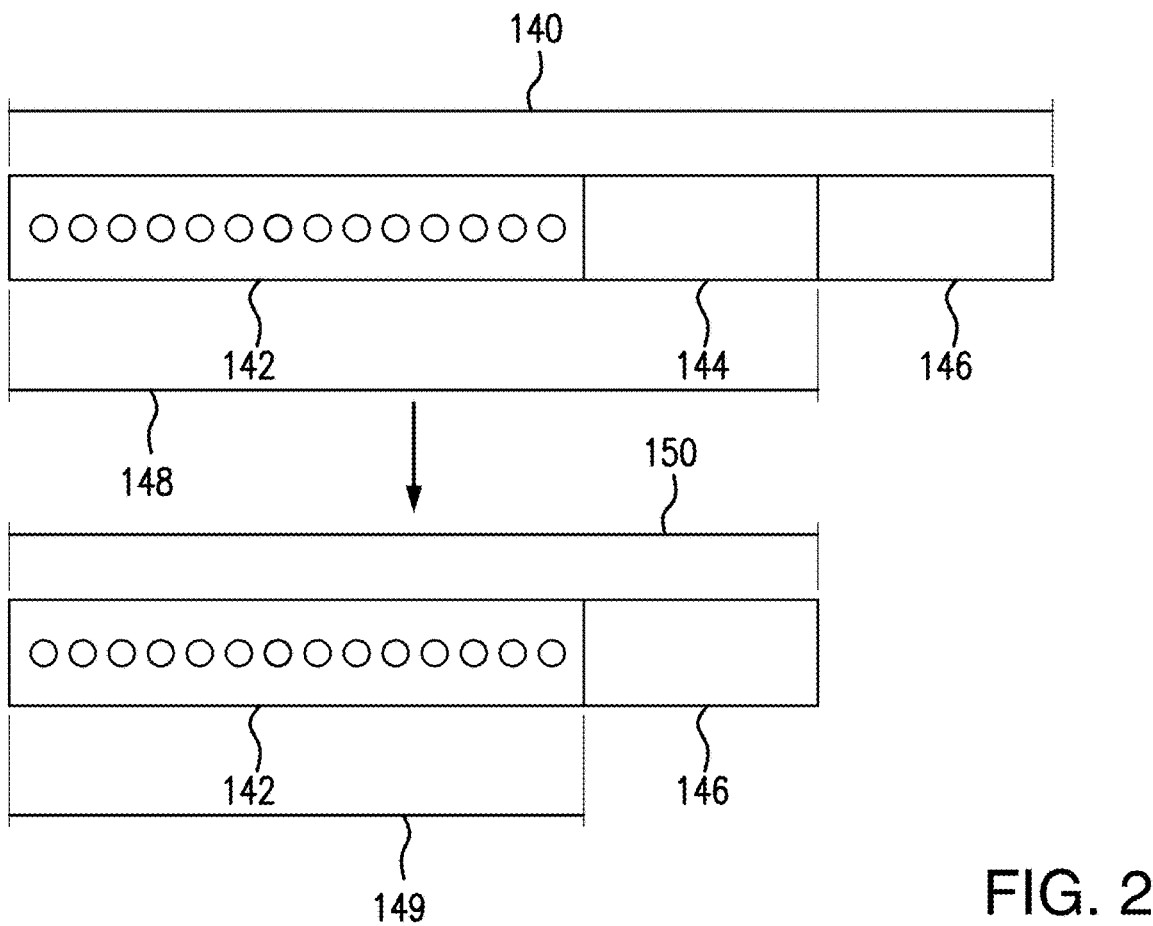
FIG. 2 is a block diagram of an embodiment of the gateway of FIG. 1, where the gateway dynamically optimizes gateway function by decreasing the scan time of the gateway.

FIG. 2 is a block diagram of an embodiment of the gateway 108 of FIG. 1, where the gateway 108 dynamically optimizes the function and reduces power consumption by decreasing a current total scan time 140 of the gateway 108. In certain embodiments, the scan time of the gateway 108 may be a predetermined or preconfigured time (e.g., default scan time) that might be a reasonable estimation of the amount of time the gateway 108 would need to receive all the beacon signals from the tags 104 disposed within the range of the gateway 108. However, the movement of the assets 102 and the tags 104 are dynamic—assets 102 are frequently brought and removed from the range of the gateway 108 and even within the range of the gateway 108.

Accordingly, it may be beneficial to include systems and methods for dynamically adapting gateway 108 operation to reflect the dynamic environment, thereby reducing power consumption and optimizing gateway function.

In certain embodiments, the current total scan time 140 is longer than needed to scan for all the tags 104 within the range of the gateway 108. Accordingly, the gateway 108 may be configured to optimize function by reducing the current total scan time 140. For example, the current total scan time 140 may include a required scan time 142, an unused scan time 144, and a buffer 146. The required scan time 142 is the amount of time needed to completely scan for all the tags 104 and receive all the beacon signals within the range of the gateway 108. The unused scan time 144 may be the amount of time during which the gateway 108 did not receive any beacon signals from any new tag 104 within the range. The current scan time 148 may be the amount of time the gateway 108 is actively searching for tags 108, which in this example includes the required scan time 142 and the unused scan time 144. The buffer 146 may be a predetermined amount of time utilized by the gateway 108 to provide for a safeguard against unexpected new beacon signals. In certain embodiments, the gateway 108 may be configured to optimize function by reducing the current total scan time 140 by the unused scan time 144. Accordingly, a new total scan time 150 may include the required scan time 142 and the buffer 146. Further, the required scan time 142 may be approximately identical to the adjusted scan time 149—such that the gateway 108 is optimized and the scan time is adapted to the actual number of tags 104 beaconing signals. In this manner, the gateway 108 also reduces power consumption by the amount of power it would have otherwise required for the unused scan time 144.

Figure 3:
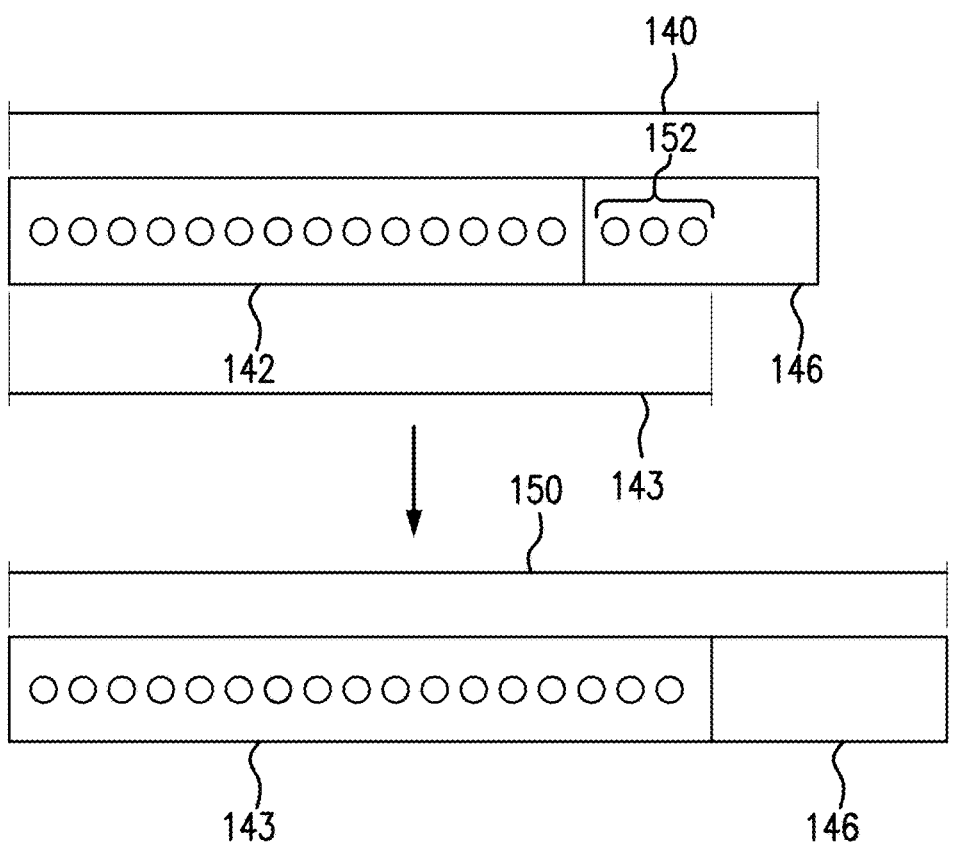
FIG. 3 is a block diagram of an embodiment of the gateway of FIG. 1, where the gateway dynamically optimizes gateway function by increasing the scan time of the gateway.

FIG. 3 is a block diagram of an embodiment of the gateway of FIG. 1, where the gateway dynamically optimizes gateway function by increasing the current total scan time 140 of the gateway 108. As noted above, it may be beneficial to include systems and methods for dynamically adapting the gateway 108 operation to reflect the dynamic movement of assets 102 and tags 104 between different locations, thereby reducing power consumption and optimizing gateway function.

In certain embodiments, the current total scan time 140 is shorter than needed to scan for all the tags 104 within the range of the gateway 108. Accordingly, the gateway 108 may be configured to optimize function by increasing the current total scan time 140. For example, the current total scan time 140 may include the current scan time 142 and the buffer 146. The current scan time 142 may not be enough time to cover all the beacon signals received from the tags 104, and certain beacons signals may overflow into the buffer time 146 (an overflow scan time 152). The required scan time 143 is the amount of time needed to completely scan for all the tags 104 and receive all the beacon signals within the range of the gateway 108. In this example, the gateway 108 identifies that the current scan time 142 is too short for the number of tags 104 within the range. Accordingly, the gateway 108 may be configured to optimize function by increasing the current scan time 142 by the overflow scan time 152 to cover all beacon signals, such as unknown beacon signals that were received. The new total scan time 150 may include the required scan time 143 (adapted and extended to include any future overflow of beacon signals 152) and the buffer 146.

In this manner, the gateway 108 may be flexible and adaptable to dynamically increase or decrease the current total scan time 140 to accommodate a dynamic environment where tags 104 (new, unknown, or known) enter and/or leave the range of the gateway 108. The gateway 108 may be continuously updating the current total scan time 140 to dynamically reflect the environment.

Figure 4:
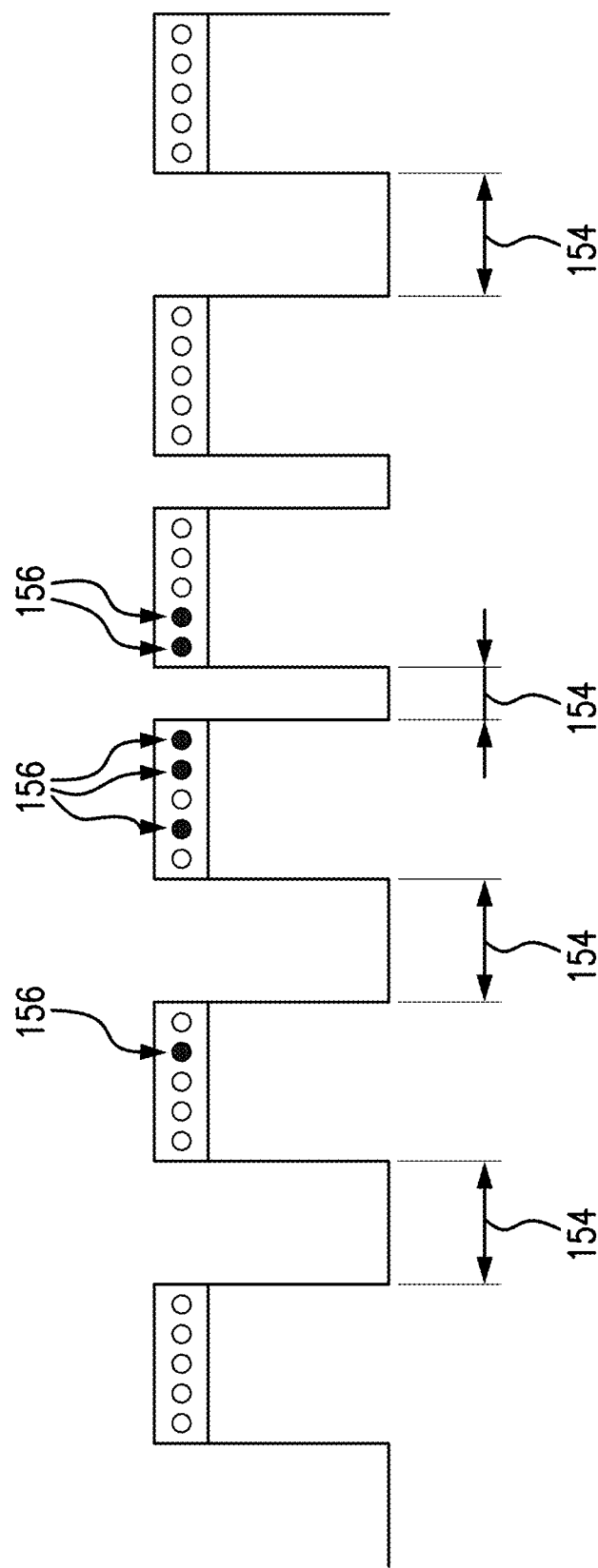
FIG. 4 is a block diagram of an embodiment of the gateway of FIG. 1, where the gateway dynamically optimizes gateway function by increasing or decreasing the scan frequency of the gateway.

FIG. 4 is a block diagram of an embodiment of the gateway 108 of FIG. 1, where the gateway 108 dynamically optimizes function by increasing or decreasing a current scan frequency by decreasing or increasing interval 154. In certain embodiments, the scan frequency of the gateway 108 may be a predetermined or preconfigured interval that might be a reasonable estimation of the amount of time between scans that the gateway 108 would need to receive all the beacon signals from the tags 104 disposed within the range. However, the movement of the assets 102 and the tags 104 are dynamic—assets 102 are frequently brought and removed from the range of the gateway 108 and even within the range of the gateway 108. Accordingly, it may be beneficial to include systems and methods for dynamically adapting gateway 108 operation to reflect the dynamic environment, thereby reducing power consumption and optimizing gateway function.

In certain embodiments, the scan frequency may be decreased by increasing the interval 154, so that a greater amount of time passes between each scan time of the gateway 108, when the gateway 108 detects little or no variability 156 (e.g., little or no change) in the beacon signals received from the tags 104. For example, when the gateway 108 does not receive any new beacon signals (from new tags 104 entering the range, a different number of beacon signals, missing beacon signals from tags previously within the range, a change in information, etc.), the scan frequency may be decreased by increasing the interval 154 to reduce power consumption without compromising the status of the dynamic inventory of assets 102. Further, in certain embodiments, the scan frequency may be increased by decreasing the interval 154, so that less time passes between each scan time of the gateway 108, when the gateway 108 detects increased variability (e.g., dynamic change within the inventory and assets 102 entering and leaving the range, changes in information, etc.) in the beacon signals received from the tags 104.

Figure 5:
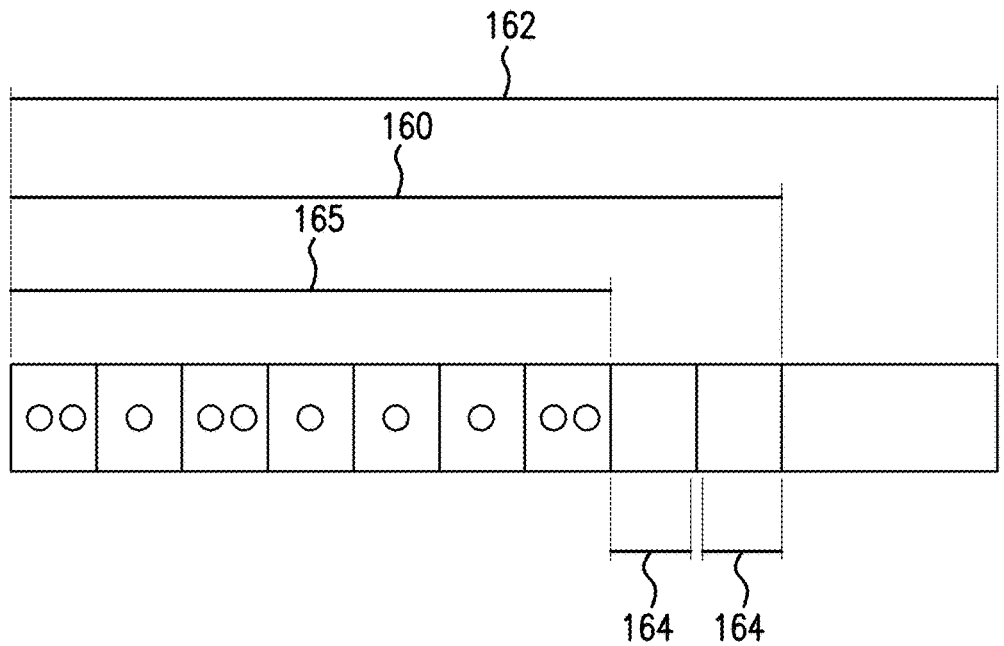
FIG. 5 is a block diagram of an embodiment of the gateway of FIG. 1, where the gateway dynamically optimizes gateway function by prematurely terminating the scan time of the gateway relative to the default scan time.

FIG. 5 is a block diagram of an embodiment of the gateway 108 of FIG. 1, where the gateway 108 dynamically optimizes gateway function by terminating a scan time 160 of the gateway 108 relative to a default scan time 162. In certain embodiments, the gateway 108 may be configured to prematurely terminate the scan time 160 if the gateway 108 does not detect any new tags 104 within the range after a predetermined number of scan periods 164. For example, in the illustrated embodiment, the gateway 108 does not receive any new beacon signals from any new or unknown tags 104 for two consecutive scan periods 164. A new beacon signal may be a beacon signal from any new or unknown tag that has previously not been seen during the scan time 165. Accordingly, the gateway 108 reduces the default scan time 162 to the scan time 160 and enters sleep mode. In certain embodiments, the gateway 108 may enter sleep mode after 1, 2, 3, 4, 5, 6, 7, 8, 9, 10 or more periods 164 where the gateway 108 does not receive any new beacon signals. In certain embodiments, the gateway 108 may enter sleep mode after "X" periods 164 if the gateway 108 does not receive any new beacon signals from previously unknown tags 104 (e.g., no new tags 104 have entered the range for "X" periods). Accordingly, it may be beneficial to include systems and methods for reducing power consumption of the gateway 108 to reflect the dynamic environment by prematurely terminating the scan time 160.

Figure 6:
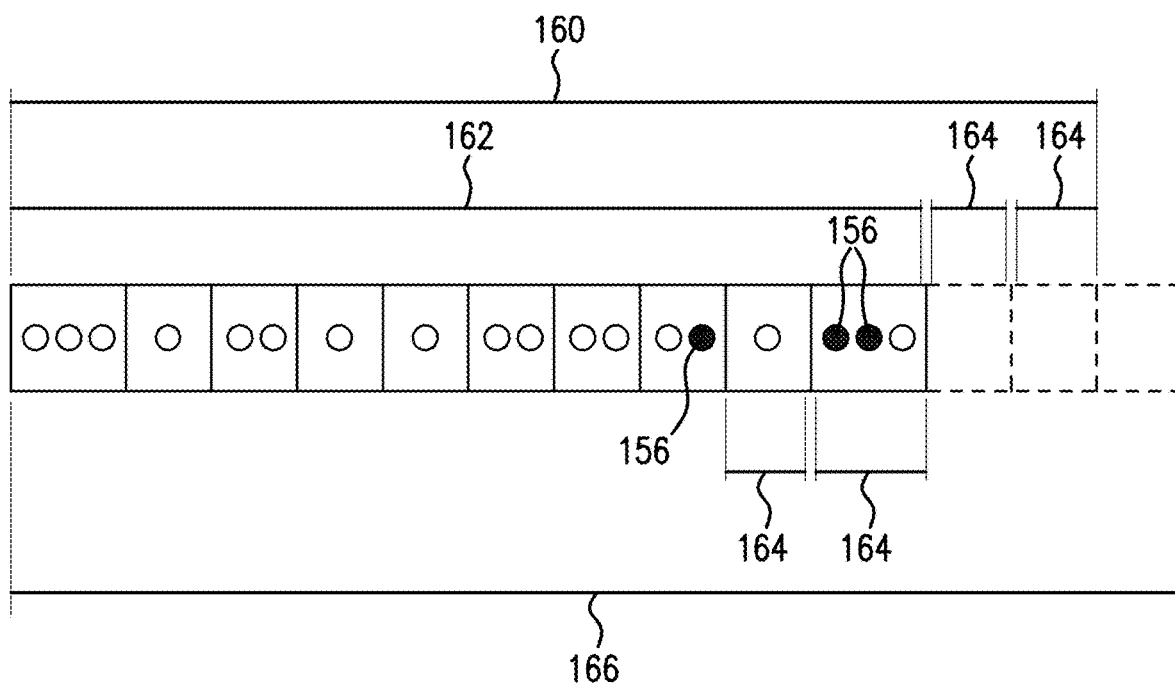
FIG. 6 is a block diagram of an embodiment of the gateway of FIG. 1, where the gateway dynamically optimizes gateway function by extending the scan time of the gateway relative to the default scan time.

FIG. 6 is a block diagram of an embodiment of the gateway 108 of FIG. 1, where the gateway 108 dynamically optimizes gateway function by extending the scan time 160 of the gateway 108 relative to the default scan time 162. In certain embodiments, the gateway 108 may be configured to extend the scan time 160 if the gateway 108 detects variability in the dynamic environment of assets 102 within the range of the gateway 108. For example, in the illustrated embodiment, the gateway 108 continues to receive new beacon signals from new or previously unknown tags 104 at the end of the default scan time 162 and extends scan time to 160 such that the gateway 108 has not received any new beacon signals in two consecutive scan periods 164. In certain embodiments, the gateway 108 may extend default scan time 162 to scan time 160 till it does not receive any new beacons for "X" consecutive number of scan periods 164 where X can be 1, 2, 3, 4 or more scan periods 164. In certain embodiments, the gateway 108 increases or extends the default scan time 162 to the scan time 160 by adding 1, 2, 3, 4, 5, 6, 7, 8, 9, 10 or more periods 164 and monitoring that it has not received any new beacons during the last "X" consecutive scan periods. In certain embodiments, gateway may also use a maximum scan time 166 that can be any value greater than the default scan time 162 such that gateway terminates scanning if current scan time 160 becomes equal or higher than maximum scan time 166. Accordingly, it may be beneficial to include systems and methods for reducing power consumption of the gateway 108 to reflect the dynamic environment by terminating or extending the scan time 160, as necessary.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
one or more assets disposed within a physical location, wherein each asset is coupled to a wireless tag, and wherein each wireless tag is configured to wirelessly transmit beacon signals at predetermined intervals; and
a gateway configured to cover the range of the physical location, and wherein the gateway is configured to:
scan the physical location to identify beacon signals transmitted by each of the wireless tags;
receive the beacon signals from each wireless tag at the predetermined intervals; and
dynamically optimize a function of the gateway by adjusting a current total scan time based at least in part on the number of beacon signals received from previously unknown or new wireless tags disposed within the physical location, wherein adjusting the current total scan time comprises increasing a current scan time of the gateway by an overflow scan time.

2. The system of claim 1, wherein dynamically optimizing a function of the gateway comprises optimizing an overall power consumption of the gateway.

3. The system of claim 1, wherein dynamically optimizing a function of the gateway comprises adjusting for the dynamic movement of the one or more assets entering and leaving the range of the gateway.

4. The system of claim 1, wherein adjusting the current total scan time comprises decreasing a current scan time of the gateway by an unused scan time.

5. The system of claim 4, wherein the unused scan time is a duration of time during which the gateway does not receive any beacon signals from a previously unknown or new wireless tag within the range.

6. The system of claim 1, wherein the overflow scan time is a duration of time during which the gateway receives beacon signals from previously unknown or new wireless tags beyond the amount of time allocated by the current scan time.

7. The system of claim 1, wherein the physical location is a construction jobsite, a warehouse, a storage asset, a shipping container, a vehicle, a mode of transportation, a worker, a transportation vehicle, a container, or a combination thereof.

8. The system of claim 1, wherein the gateway comprises cellular capabilities or a fixed line to route information to the remote asset management platform.

9. The system of claim 1, wherein each wireless tag is removably coupled to an external surface of each asset of the one or more assets.

* * * * *